United States Patent
Ohta et al.

(10) Patent No.: US 7,714,295 B2
(45) Date of Patent: May 11, 2010

(54) IMAGE DETECTING DEVICE AND IMAGE CAPTURING SYSTEM

(75) Inventors: Yasunori Ohta, Yokohama (JP); Kazuo Hakamata, Odawara (JP); Kuniaki Miyako, Minami-ashigara (JP); Hajime Nakata, Minami-ashigara (JP); Yuto Tanaka, Kawasaki (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 12/239,361

(22) Filed: Sep. 26, 2008

(65) Prior Publication Data

US 2009/0084969 A1   Apr. 2, 2009

(30) Foreign Application Priority Data

Sep. 27, 2007 (JP) .............. 2007-252438

(51) Int. Cl.
*G01T 1/24* (2006.01)
(52) U.S. Cl. .............................. 250/370.15
(58) Field of Classification Search ......... 250/370.01–370.15; 378/98.8
See application file for complete search history.

(56) References Cited

U.S. PATENT DOCUMENTS

| | | | | |
|---|---|---|---|---|
| 5,319,696 | A * | 6/1994 | Abdel-Malek et al. | 378/108 |
| 6,713,769 | B2 * | 3/2004 | Vafi et al. | 250/370.15 |
| 2005/0017188 | A1 * | 1/2005 | Yagi | 250/370.09 |
| 2005/0067579 | A1 * | 3/2005 | Tsuchiya et al. | 250/370.15 |
| 2005/0287008 | A1 * | 12/2005 | Lacey et al. | 417/32 |
| 2006/0026610 | A1 * | 2/2006 | Sasao et al. | 720/649 |
| 2007/0227700 | A1 * | 10/2007 | Dimitrakopoulos et al. | 165/104.11 |
| 2007/0276248 | A1 * | 11/2007 | Saito et al. | 600/459 |

FOREIGN PATENT DOCUMENTS

JP   2001-281343 A   10/2001
JP   2007-105859 A   4/2007

* cited by examiner

*Primary Examiner*—David P Porta
*Assistant Examiner*—Kiho Kim
(74) *Attorney, Agent, or Firm*—Sughrue Mion, PLLC

(57) ABSTRACT

An image detecting device includes an image detector for recording an image therein and outputting the recorded image as image information, and a cooling panel disposed on a surface of the image detector for cooling the image detector, wherein the cooling panel has a thermal conductivity oriented in a planar direction along the surface of the image detector.

9 Claims, 9 Drawing Sheets

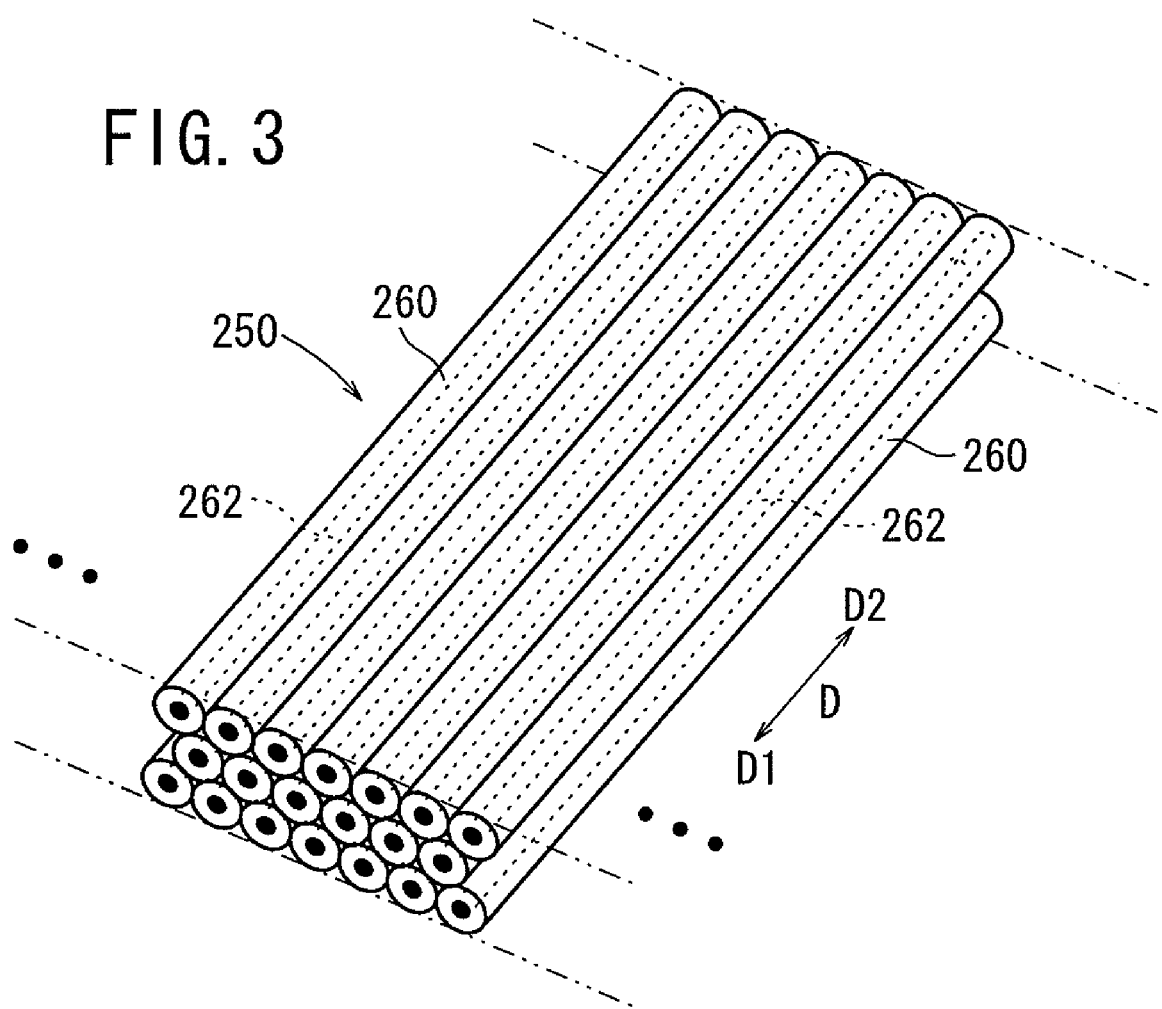

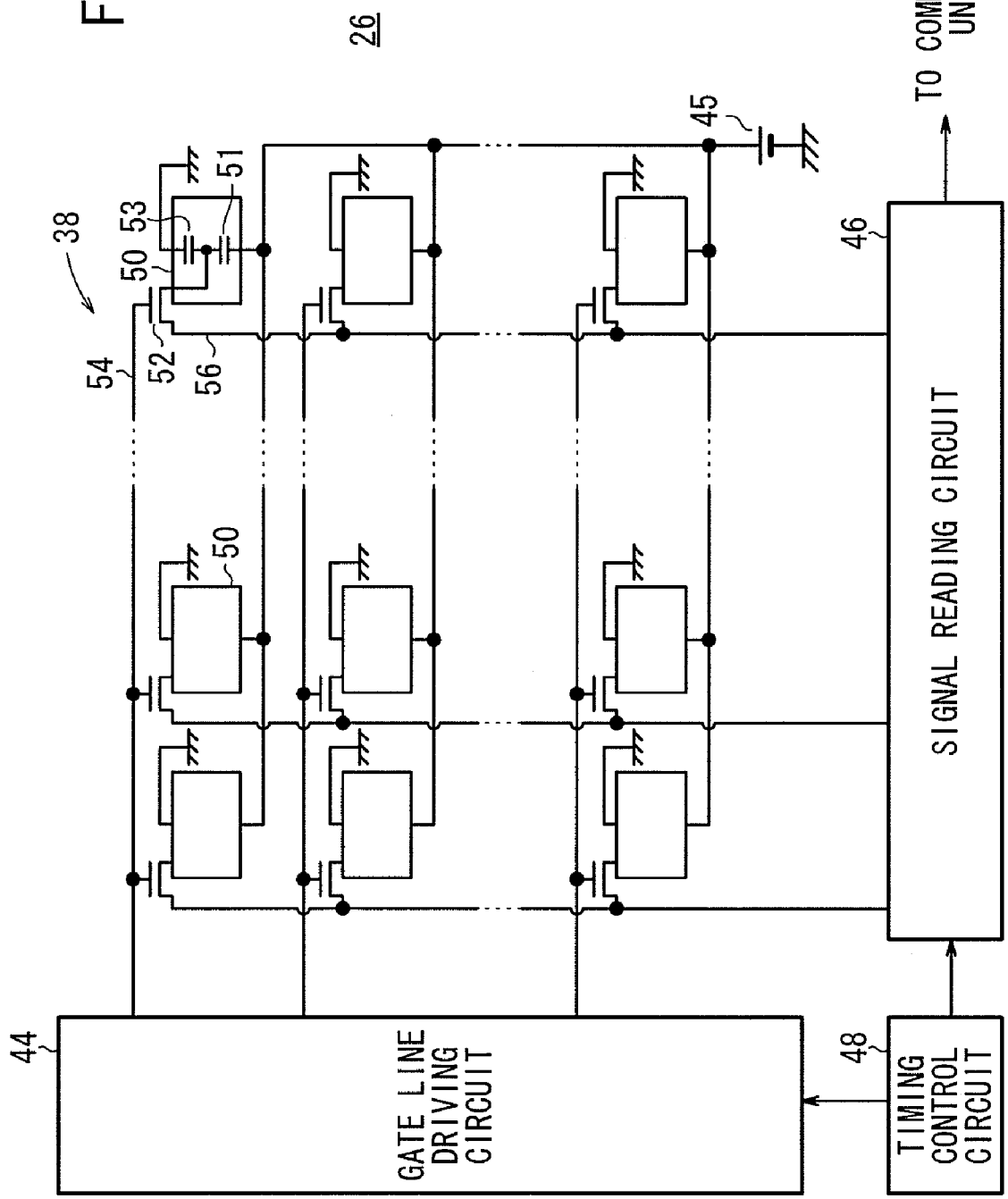

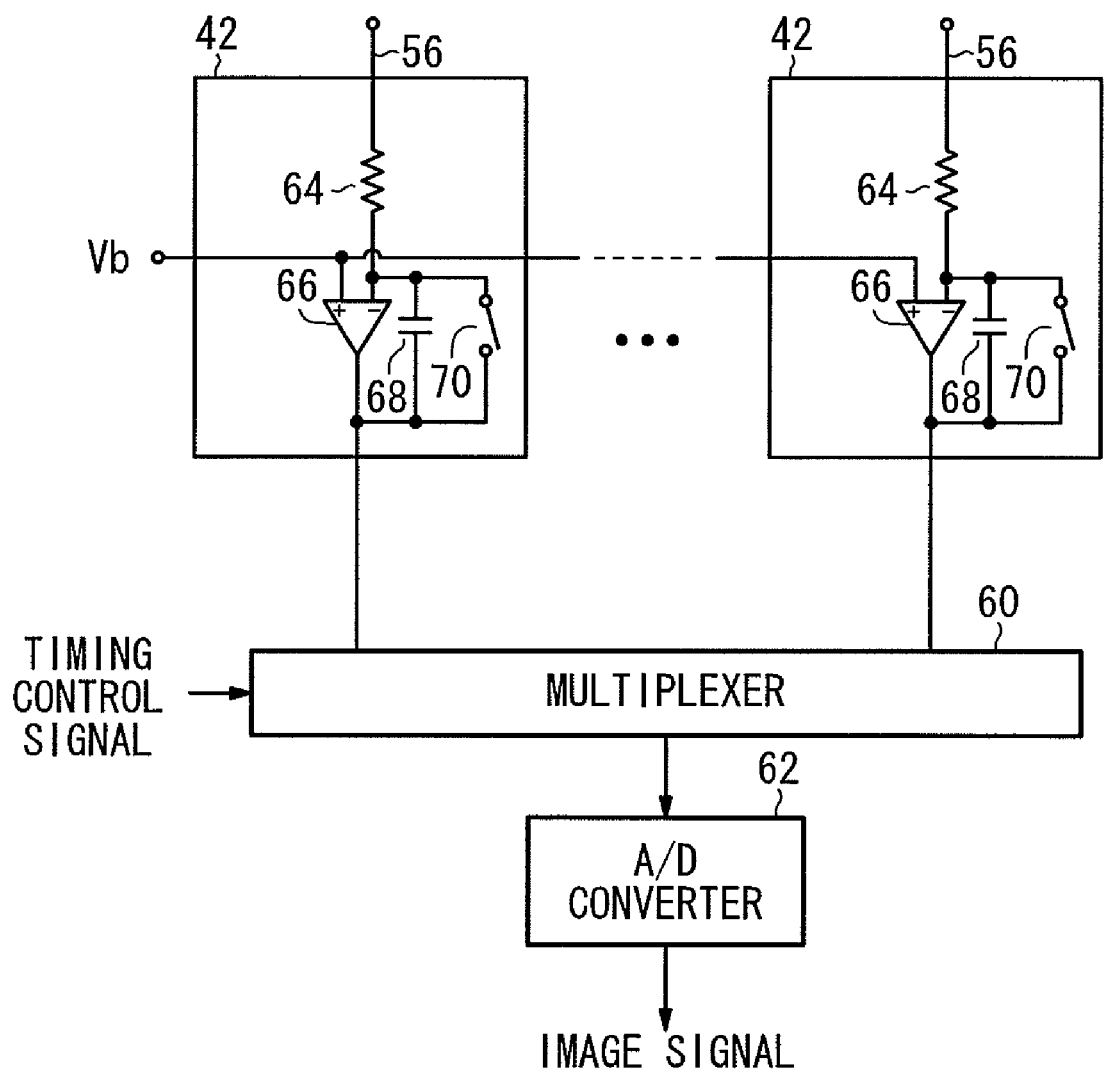

IMAGE DETECTING DEVICE AND IMAGE CAPTURING SYSTEM

BACKGROUND OF THE INVENTION

1. Field of the Invention:

The present invention relates to an image detecting device for outputting image information representative of an image recorded in a given recording area, and to an image capturing system that incorporates such an image detecting device therein.

2. Description of the Related Art:

In the medical field, there have widely been used image capturing apparatuses, which apply a radiation from a radiation source to a subject (a patient) and which detect the radiation that has passed through the subject with an image detector, in order to acquire radiation image information of the subject.

Japanese Laid-Open Patent Publication No. 2001-281343 discloses an active matrix substrate with a detector mounted thereon and a base plate laminated on the rear surface of the active matrix substrate by a gel sheet. The gel sheet is made of a thermally conductive viscoelastic material, and the base plate is made of a highly thermally conductive material for reducing variations in the temperature distribution of the active matrix substrate.

According to Japanese Laid-Open Patent Publication No. 2001-281343, as described above, the base plate supports the active matrix substrate through the gel sheet for reducing variations in the temperature distribution of the active matrix substrate. It is expected that a detector (image detector) mounted on the active matrix substrate will suffer variations (irregularities) in the temperature distribution thereof. However, there is nothing disclosed in Japanese Laid-Open Patent Publication No. 2001-281343 for quickly removing irregularities in the temperature distribution of the detector.

In addition, Japanese Laid-Open Patent Publication No. 2001-281343 merely shows the manner in which the base plate is laminated onto the active matrix substrate by the gel sheet, and is silent concerning how to increase the thermal conductivity of the gel sheet in order to radiate heat out of the active matrix substrate.

SUMMARY OF THE INVENTION

It is an object of the present invention to provide an image detecting device and an image capturing system, which are capable of uniformly and efficiently adjusting the temperature distribution of an image detector.

According to the present invention, an image detecting device comprises an image detector for recording an image therein and outputting the recorded image as image information, and a cooling panel disposed on a surface of the image detector for cooling the image detector, wherein the cooling panel has a thermal conductivity oriented in a planar direction along the surface of the image detector.

Since the cooling panel is disposed on the surface of the image detector, heat from the image detector is transferred in the planar direction of the image detector, in which the thermal conductivity of the cooling panel is oriented, and the heat is radiated out of the cooling panel. The overall efficiency at which heat is radiated from the image detecting device is better than in the image detecting device of the related art, thereby making the temperature distribution of the image detector more uniform, and making it possible to adjust the temperature distribution highly efficiently.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 3 is a perspective view showing internal structural details of a carbon sheet shown in FIGS. 2A and 2B;

FIG. 5 is a block diagram of the radiation solid-state detecting device shown in FIG. 1;

FIG. 6 is a detailed block diagram of a signal reading circuit shown in FIG. 5;

DESCRIPTION OF THE PREFERRED EMBODIMENTS

Figure 1:
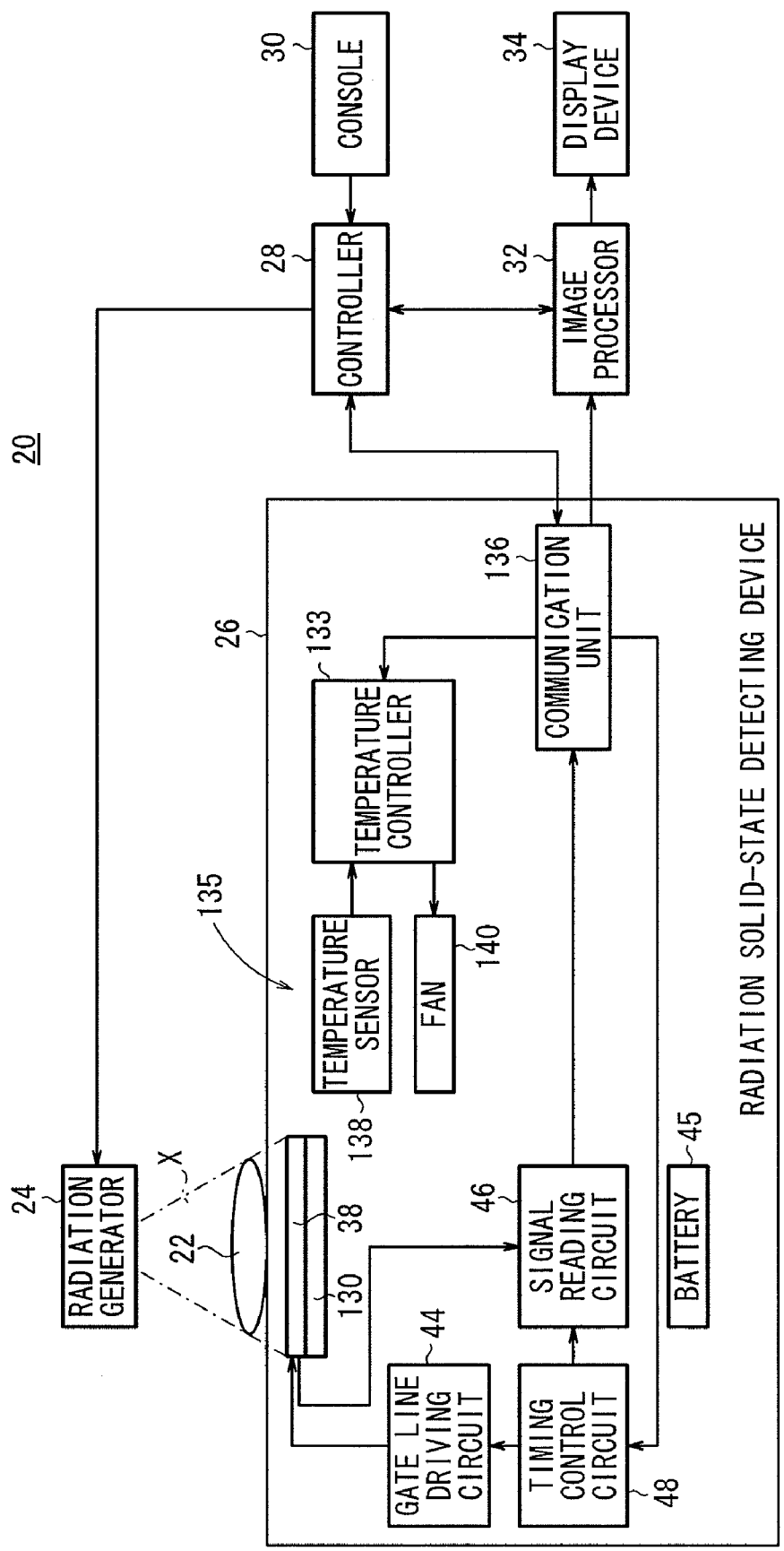
FIG. 1 is a block diagram of an image capturing system according to an embodiment of the present invention.

As shown in FIG. 1, an image capturing system 20 according to an embodiment of the present invention comprises a radiation generator 24 for generating and applying radiation X to a subject 22, typically a patient, a radiation solid-state detecting device (an image detecting device, a radiation image information detecting device) 26 for detecting radiation X that has passed through the subject 22, a controller 28 for controlling the radiation generator 24 and the radiation solid-state detecting device 26, a console 30 for setting image capturing conditions in the controller 28, such as a radiation dose for the radiation X to be applied to the subject 22, an image processor 32 for processing radiation image information of the subject 22 that is read from the radiation solid-state detecting device 26, and a display device 34 for displaying the processed radiation image information.

The radiation solid-state detecting device 26 comprises a sensor substrate (image detector) 38, a gate line driving circuit 44, a battery 45, a signal reading circuit 46, a timing control circuit 48, a temperature regulation control means 135, and a communication unit 136. The temperature regulation control means 135 comprises a cooling panel 130, a temperature controller 133, a temperature sensor 138, and a fan (a cooling fan) 140.

Figure 2A:
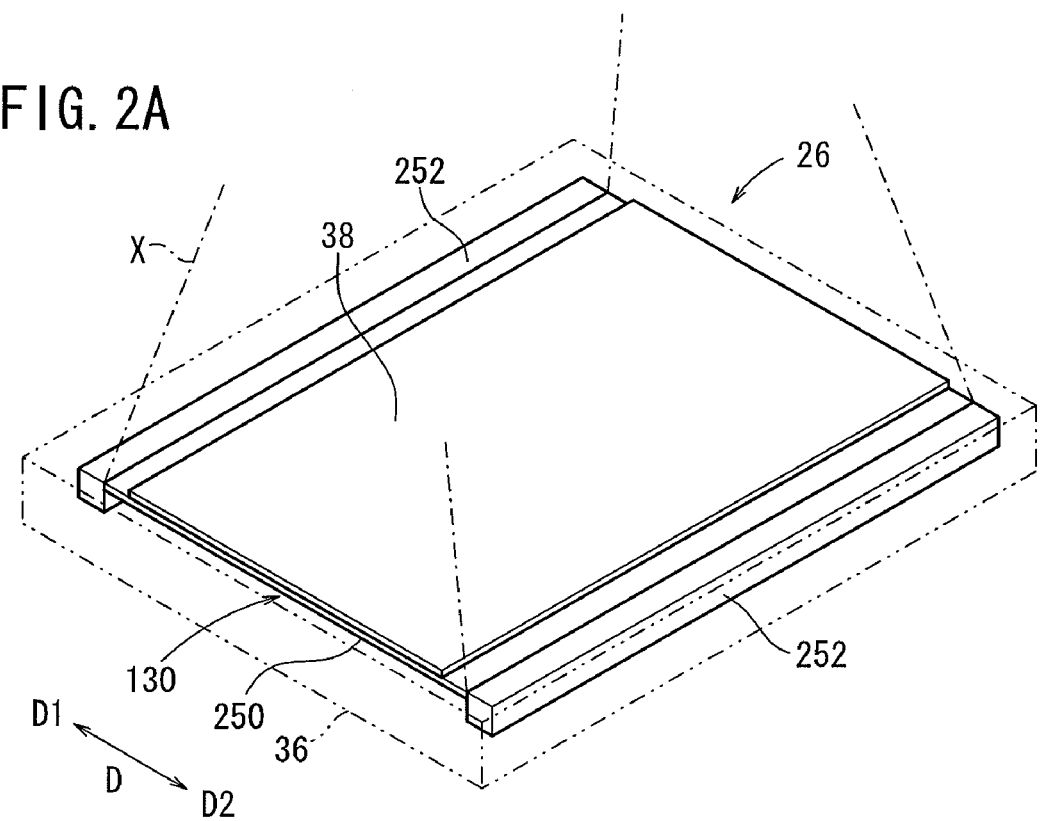
FIG. 2A is a perspective view of a radiation solid-state detecting device shown in FIG. 1, with a cooling panel disposed on the rear surface of a sensor substrate.
Figure 2B:
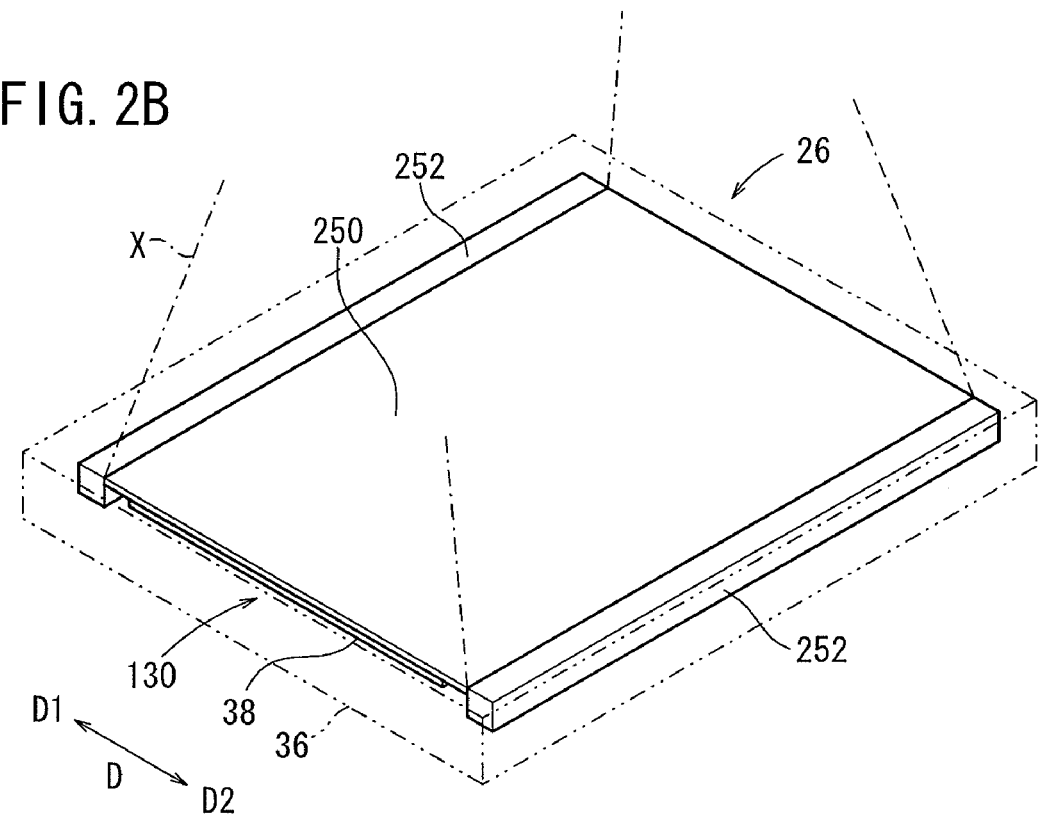
FIG. 2B is a perspective view of the radiation solid-state detecting device shown in FIG. 1, with the cooling panel disposed on an irradiated surface of the sensor substrate.

FIGS. 2A and 2B show in perspective the radiation solid-state detecting device 26. As shown in FIGS. 2A and 2B, the radiation solid-state detecting device 26 comprises a sensor substrate 38 housed in a protective casing 36 for storing (recording) radiation image information carried by the radiation X that has passed through the subject 22 (see FIG. 1) as two-dimensional electric charge information, and a cooling panel 130 held closely against a front surface (irradiated surface), which is irradiated with the radiation X, or on a rear surface of the sensor substrate 38 that is opposite to the front surface thereof.

FIG. 2A shows the radiation solid-state detecting device 26 with the cooling panel 130 being disposed substantially fully over the rear surface of the sensor substrate 38. FIG. 2B shows the radiation solid-state detecting device 26 with the cooling panel 130 being disposed substantially fully over the irradiated surface of the sensor substrate 38.

The cooling panel 130 comprises a thermally conductive carbon sheet 250 disposed either on the irradiated surface or on the rear surface of the sensor substrate 38, and a pair of heat radiating blocks 252 coupled to respective ends of the carbon sheet 250, in directions indicated by the arrow D, i.e., in the directions indicated by the respective arrows D1 and D2. The directions indicated by the arrow D refer to transverse directions of the sensor substrate 38 among all directions along the irradiated and rear surfaces of the sensor substrate 38.

The carbon sheet 250 disposed on the irradiated or rear surface of the sensor substrate 38 has end portions projecting beyond side edges of the sensor substrate 38 in the directions indicated by the arrow D, i.e., in the directions indicated by the respective arrows D1 and D2. The heat radiating blocks 252 are spaced from the respective side edges of the sensor substrate 38 in the directions indicated by the arrow D, i.e., in the directions indicated by the respective arrows D1 and D2, and are coupled to the respective end portions of the carbon sheet 250, which project beyond the side edges of the sensor substrate 38.

FIG. 3 shows in perspective the internal structural details of the carbon sheet 250. The carbon sheet 250 includes a mesostructured film having an array of thin tubular through holes 260 that extend in the directions indicated by the arrow D, and carbon nanotubes 262 extending through the thin tubular through holes 260, also in the directions indicated by the arrow D. The carbon sheet 250 exhibits a thermal conductivity, which is oriented in the directions indicated by the arrow D. The carbon sheet 250 including the thin tubular through holes 260 and the carbon nanotubes 262 may be fabricated according to the technology disclosed in Japanese Laid-Open Patent Publication No. 2007-105859, for example.

Figure 4A:
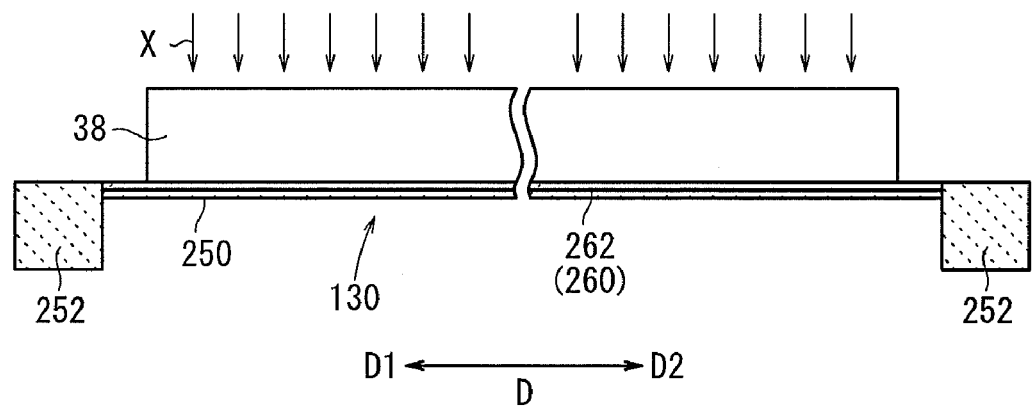
FIG. 4A is a fragmentary cross-sectional view of the cooling panel shown in FIG. 2A.
Figure 4B:
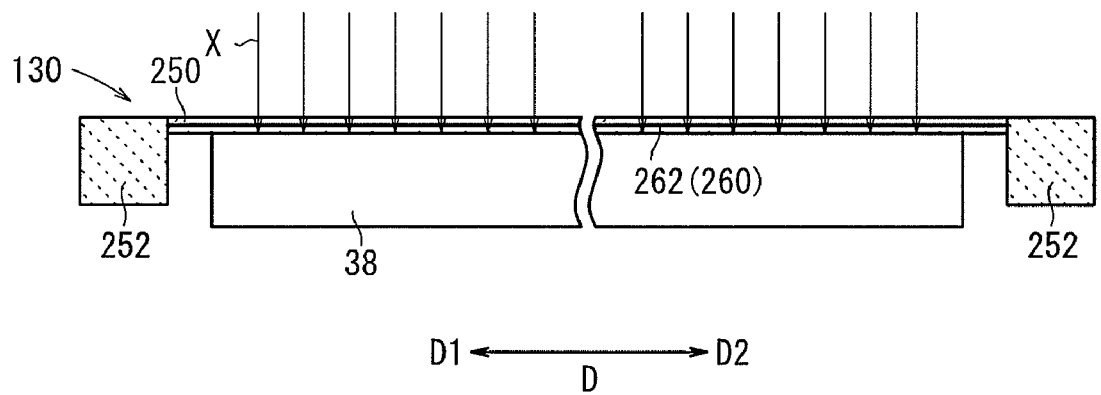
FIG. 4B is a fragmentary cross-sectional view of the cooling panel shown in FIG. 2B.

FIGS. 4A and 4B show the cooling panel 130 in fragmentary cross section. The heat radiating blocks 252 are connected to ends (tip ends) of the carbon nanotubes 262, in the directions indicated by the respective arrows D1 and D2. Therefore, the heat of the sensor substrate 38 is transferred through the carbon nanotubes 262 to the heat radiating blocks 252, from which the heat is radiated out of the cooling panel 130. In FIG. 4A, the cooling panel 130 is disposed on the rear surface of the sensor substrate 38.

In FIG. 4B, the cooling panel 130 is disposed on the irradiated surface of the sensor substrate 38. When the cooling panel 130 is disposed on the irradiated surface of the sensor substrate 38, the carbon sheet 250 and the heat radiating blocks 252 are made of a material that is permeable to radiation X.

FIG. 5 shows the radiation solid-state detecting device 26 in block form. As shown in FIG. 5, the radiation solid-state detecting device 26 comprises the sensor substrate 38, a gate line driving circuit 44 having a plurality of driving ICs, not shown, a signal reading circuit 46 having a plurality of reading ICs 42 (see FIG. 6), and a timing control circuit 48 for controlling the gate line driving circuit 44 and the signal reading circuit 46.

The sensor substrate 38 comprises an array of thin-film transistors (TFTs) 52 arranged in rows and columns, a photoelectric conversion layer 51 made of a material such as amorphous selenium (a-Se) for generating electric charges upon detection of radiation X, the photoelectric conversion layer 51 being disposed on the array of TFTs 52, and an array of storage capacitors 53 connected to the photoelectric conversion layer 51. When radiation X is applied to the sensor substrate 38, the photoelectric conversion layer 51 generates electric charges, and the storage capacitors 53 store the generated electric charges therein. Then, the TFTs 52 are turned on, each row at a time, to read the electric charges from the storage capacitors 53 as an image signal. In FIG. 5, the photoelectric conversion layer 51 and one of the storage capacitors 53 are shown as making up a pixel 50, the pixel 50 being connected to one of the TFTs 52. Details of the other pixels 50 are omitted from illustration. Since amorphous selenium tends to change in structure and lose functions at high temperatures, amorphous selenium needs to be used within a certain temperature range. The TFTs 52 connected to the respective pixels 50 are connected to respective gate lines 54 extending parallel to the rows, and to respective signal lines 56 extending parallel to the columns. The gate lines 54 are connected to the gate line driving circuit 44, and the signal lines 56 are connected to the signal reading circuit 46.

FIG. 6 shows the signal reading circuit 46 in detailed block form. As shown in FIG. 6, the signal reading circuit 46 comprises a plurality of reading ICs 42 connected to the respective signal lines 56 of the sensor substrate 38 (see FIGS. 1 through 2B and FIGS. 4A through 5), a multiplexer 60 for selecting pixels 50 connected to one of the signal lines 56 based on a timing signal from the timing control circuit 48, and an A/D converter 62 for converting radiation image information read from the selected pixels into a digital image signal and sending (outputting) the digital image signal via the communication unit 136 to the image processor 32.

Each of the reading ICs 42 comprises an operational amplifier (integrating amplifier) 66 for detecting current supplied from the signal line 56 through a resistor 64, an integrating capacitor 68, and a switch 70. The operational amplifier 66 has an inverting input terminal connected to the signal line 56 through the resistor 64, and a non-inverting input terminal supplied with a reference voltage Vb.

As described above, the photoelectric conversion layer 51 (see FIG. 5) of the sensor substrate 38 is made of amorphous selenium, which tends to change in structure and lose functions thereof at high temperatures. Therefore, amorphous selenium needs to be used within a certain temperature range. The radiation solid-state detecting device 26 has the temperature regulation control means 135 (see FIG. 1) for cooling the sensor substrate 38 when the temperature of the photoelectric conversion layer 51 (amorphous selenium) exceeds the temperature range, thereby keeping the temperature of the photoelectric conversion layer 51 within the given temperature range.

The temperature sensor 138 of the temperature regulation control means 135 is disposed near the sensor substrate 38. The temperature sensor 138 detects the temperature of the sensor substrate 38 depending on the temperature of the amorphous selenium, at all times or at certain time intervals, and outputs the detected temperature of the sensor substrate 38 to the temperature controller 133. The temperature controller 133 determines whether the input temperature of the sensor substrate 38 has exceeded a given upper-limit temperature depending on the upper-limit value of the temperature range for the photoelectric conversion layer 51 (amorphous selenium). If the temperature controller 133 judges that the temperature of the sensor substrate 38 has exceeded the upper-limit temperature, then the temperature controller 133 energizes the fan 140. The fan 140 applies air to the heat radiating blocks 252 to cool the heat radiating blocks 252 for thereby promoting radiation of heat from the heat radiating blocks 252.

The upper-limit temperature referred to above may be pre-registered in the temperature controller 133, or it may be pre-registered as one of the image capturing conditions in the controller 28, and transmitted from the controller 28 via the communication unit 136 to the temperature controller 133 before the radiation image is captured.

The image capturing system 20 according to the present embodiment is basically constructed as described above. Operations of the image capturing system 20 will be described below with reference to FIGS. 1 through 6.

Using the console 30, the operator, typically a radiological technician, sets ID information concerning the subject 22, image capturing conditions, etc. The ID information includes information as to the name, age, sex, etc., of the subject 22, and can be acquired from an ID card possessed by the subject 22. The image capturing conditions include, in addition to information concerning the region of the subject 22 to be imaged, an image capturing direction, etc., as specified by the doctor in charge of the subject 22, an irradiation dose of the radiation X depending on the region to be imaged, and the upper-limit temperature for the sensor substrate 38, which corresponds to the upper-limit value of the temperature range for amorphous selenium. If the image capturing system 20 is connected to a network, then such items of information can be acquired from a higher-level apparatus through the network. Alternatively, the items of information can be entered from the console 30 by the operator.

After the region of the subject 22 to be imaged has been positioned with respect to the radiation solid-state detecting device 26, the controller 28 controls the radiation generator 24 and the radiation solid-state detecting device 26 according to the set image capturing conditions.

The temperature sensor 138 detects the temperature of the sensor substrate 38 depending on the temperature of the amorphous selenium, at all times or at certain time intervals, and outputs the detected temperature of the sensor substrate 38 to the temperature controller 133. The temperature controller 133 determines whether the temperature of the sensor substrate 38 has exceeded a given upper-limit temperature depending on the upper-limit value of the temperature range for the photoelectric conversion layer 51 (amorphous selenium), each time that the temperature controller 133 is supplied with the temperature of the sensor substrate 38 from the temperature sensor 138, which may occur at all times or at certain time intervals.

The radiation generator 24 applies radiation X to the subject 22 according to the image capturing conditions sent from the controller 28. Radiation X which has passed through the subject 22 is converted into electric signals by the photoelectric conversion layer 51 made up of pixels 50 in the sensor substrate 38 of the radiation solid-state detecting device 26. The electric signals are stored as electric charges in the storage capacitors 53 (see FIG. 5). The stored electric charges, which represent radiation image information of the subject 22, are read from the storage capacitors 53, according to timing control signals supplied from the timing control circuit 48 to the gate line driving circuit 44 and the signal reading circuit 46.

Specifically, the gate line driving circuit 44 selects one of the gate lines 54 according to the timing control signal from the timing control circuit 48, and supplies a drive signal to bases of the TFTs 52 connected to the selected gate line 54. The multiplexer 60 of the signal reading circuit 46 successively switches between the signal lines 56 connected to the reading ICs 42, in order to select one signal line 56 at a time. The electric charge representing radiation image information that is stored in the storage capacitor 53 of the pixel 50 corresponding to the selected gate line 54 and the selected signal line 56 is supplied through the resistor 64 to the operational amplifier 66. The operational amplifier 66 integrates the supplied electric charges and supplies them through the multiplexer 60 to the A/D converter 62, which converts the electric charges into a digital image signal. The digital image signal is supplied through the communication unit 136 to the image processor 32. After all of the image signals have been read from the pixels 50 connected to the selected gate line 54, the gate line driving circuit 44 selects the next gate line 54 and supplies a drive signal to the selected gate line 54. The signal reading circuit 46 then successively reads image signals from the TFTs 52 that are connected to the selected gate line 54, in the same manner as described above. The above operations are repeated in order to read the two-dimensional radiation image information stored in the pixels 50 of the sensor substrate 38, and to supply the read two-dimensional radiation image information to the image processor 32.

Radiation image information supplied to the image processor 32 is processed thereby. The display device 34 displays an image, based on the processed radiation image information from the image processor 32, for diagnostic purposes. The doctor makes a diagnosis based on the image displayed on the display device 34.

Heat from the amorphous selenium in the sensor substrate 38 is transferred through the carbon nanotubes 262 of the carbon sheet 250 to the heat radiating blocks 252, whereupon the heat is radiated out of the cooling panel 130.

The temperature controller 133 (see FIG. 1) sequentially determines whether (the temperature of the sensor substrate 38 depending on) the temperature of the amorphous selenium has exceeded (the upper-limit temperature of the sensor substrate 38 depending on the upper-limit value of) the temperature range for amorphous selenium. If the temperature controller 133 judges that the temperature of the sensor substrate 38 has exceeded the upper-limit temperature, then the temperature controller 133 energizes the fan 140. The fan 140 applies air to the heat radiating blocks 252 in order to cool the heat radiating blocks 252 and promote radiation of heat therefrom.

If the temperature controller 133 judges that the temperature of the sensor substrate 38 detected by the temperature sensor 138 has become lower than the upper-limit temperature, then the temperature controller 133 de-energizes the fan 140.

With the image capturing system 20 according to the present embodiment, the radiation solid-state detecting device 26 includes the cooling panel 130, which is disposed on the irradiated or on the rear surface of the sensor substrate 38. The cooling panel 130 exhibits a thermal conductivity that is oriented in a planar direction along the surface of the sensor substrate 38, in the directions indicated by the arrow D. Therefore, heat from the amorphous selenium in the sensor substrate 38 is transferred in the directions indicated by the arrow D and radiated out of the cooling panel 130. The overall efficiency at which heat is radiated from the radiation solid-state detecting device 26 is better than in the radiation solid-state detecting device of the related art, thus making the temperature distribution of the sensor substrate 38 uniform, and making it possible to adjust the temperature distribution more efficiently.

The cooling panel 130 comprises the carbon sheet 250 that is disposed on the irradiated or on the rear surface of the sensor substrate 38, and having a thermal conductivity oriented in the directions indicated by the arrow D. The heat radiating blocks 252 are coupled to respective ends of the carbon sheet 250 in the directions indicated by the arrow D, i.e., in the directions indicated by the respective arrows D1 and D2, for radiating heat transferred from the sensor substrate 38 through the carbon sheet 250 and out of the cooling panel 130. The cooling panel 130 is of a simple structure, including the carbon sheet 250 and the heat radiating blocks 252, and is capable of radiating heat of the sensor substrate 38 without energy being supplied thereto from the temperature controller 133. Consequently, the temperature distribution of the sensor substrate 38 is adjusted and made uniform efficiently, thereby conserving energy in the radiation solid-state detecting device 26.

The carbon sheet 250 comprises carbon nanotubes 262 that extend in the directions indicated by the arrow D, and the heat radiating blocks 252 are coupled to respective ends of the carbon sheet 250, in the directions indicated by the respective arrows D1 and D2. Accordingly, heat transferred from the sensor substrate 38 to the carbon nanotubes 262 can be radiated reliably and efficiently from the heat radiating blocks 252.

If the irradiated or rear surface of the sensor substrate 38 has an elongate rectangular shape as viewed in plan, then the carbon nanotubes 262 extend in transverse directions of the irradiated or rear surface, i.e., in the directions indicated by the arrow D, whereas the heat radiating blocks 252 extend in directions perpendicular to the directions indicated by the arrow D, i.e., in the longitudinal direction of the sensor substrate 38. Therefore, heat transferred from the sensor substrate 38 to the carbon nanotubes 262 is radiated from the cooling panel 130 through a wide area. In addition, heat is transferred over a short distance from the sensor substrate 38 through the carbon nanotubes 262 and to the heat radiating blocks 252. As a consequence, heat is radiated efficiently from the heat radiating blocks 252.

The temperature sensor 138 detects the temperature of the sensor substrate 38 depending on the temperature of the amorphous selenium. The temperature controller 133 determines whether the detected temperature has exceeded the upper-limit temperature for the sensor substrate 38, depending on the upper-limit value of the temperature range for amorphous selenium. If the temperature controller 133 judges that the detected temperature has exceeded the upper-limit temperature, then the temperature controller 133 energizes the fan 140 so that (the temperature of the amorphous selenium indicated by) the temperature of the sensor substrate 38 will drop to (the upper-limit value of the temperature range indicated by) the upper-limit temperature. The fan 140 applies air to the cooling panel 130 for promoting radiation of heat, which is transferred from the sensor substrate 38, through the carbon sheet 250 to the cooling panel 130, and out of the cooling panel 130. Therefore, the sensor substrate 38 is cooled efficiently.

If the cooling panel 130 is disposed on the irradiated surface of the sensor substrate 38, then the cooling panel 130 should be made of a material that is permeable to radiation X. Therefore, it is possible to cool the sensor substrate 38, regardless of the radiation X applied to the sensor substrate 38.

Figure 7:
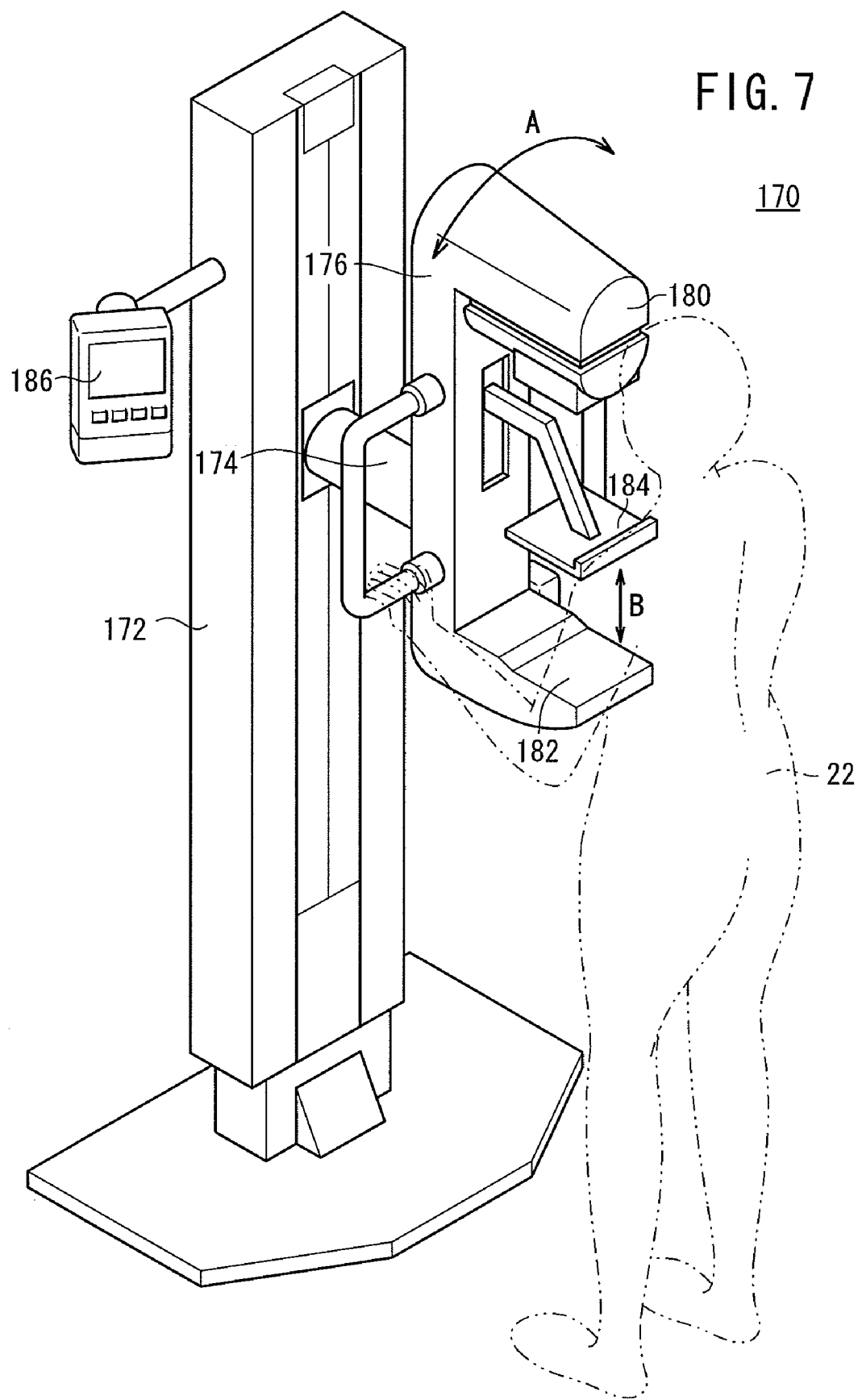
FIG. 7 is a perspective view of a mammographic apparatus, which incorporates the image capturing system shown in FIG. 1.

FIG. 7 shows in perspective a mammographic apparatus 170 utilized for breast cancer screening, which incorporates the image capturing system 20 according to the present embodiment.

As shown in FIG. 7, the mammographic apparatus 170 includes an upstanding base 172, a vertical arm 176 fixed to a horizontal swing shaft 174 and disposed substantially centrally on the base 172, a radiation source housing unit 180 housing therein a radiation source, not shown, for applying radiation X to a breast 179 (see FIG. 8) of a subject 22 to be imaged and which is fixed to an upper end of the arm 176, an image capturing base 182 mounted on a lower end of the arm 176 in confronting relation to the radiation source housing unit 180, and a compression plate 184 for compressing and holding the breast 179 against the image capturing base 182.

When the arm 176, to which the radiation source housing unit 180 and the image capturing base 182 are secured, is angularly moved about the swing shaft 174 in the directions indicated by the arrow A, an image capturing direction with respect to the breast 179 of the subject 22 can be adjusted. The compression plate 184 that is coupled to the arm 176 is disposed between the radiation source housing unit 180 and the image capturing base 182. The compression plate 184 is displaceable vertically along the arm 176 in the directions indicated by the arrow B.

A display control panel 186 is connected to the base 172 for displaying image capturing information, including an image capturing region, an image capturing direction, etc., of the subject 22, which have been detected by the mammographic apparatus 170, the ID information of the subject 22, etc., and enabling setting of these items of information, if necessary. The display control panel 186 has functions that are part of the functions of the console 30 and the display device 34 (see FIG. 1).

Figure 8:
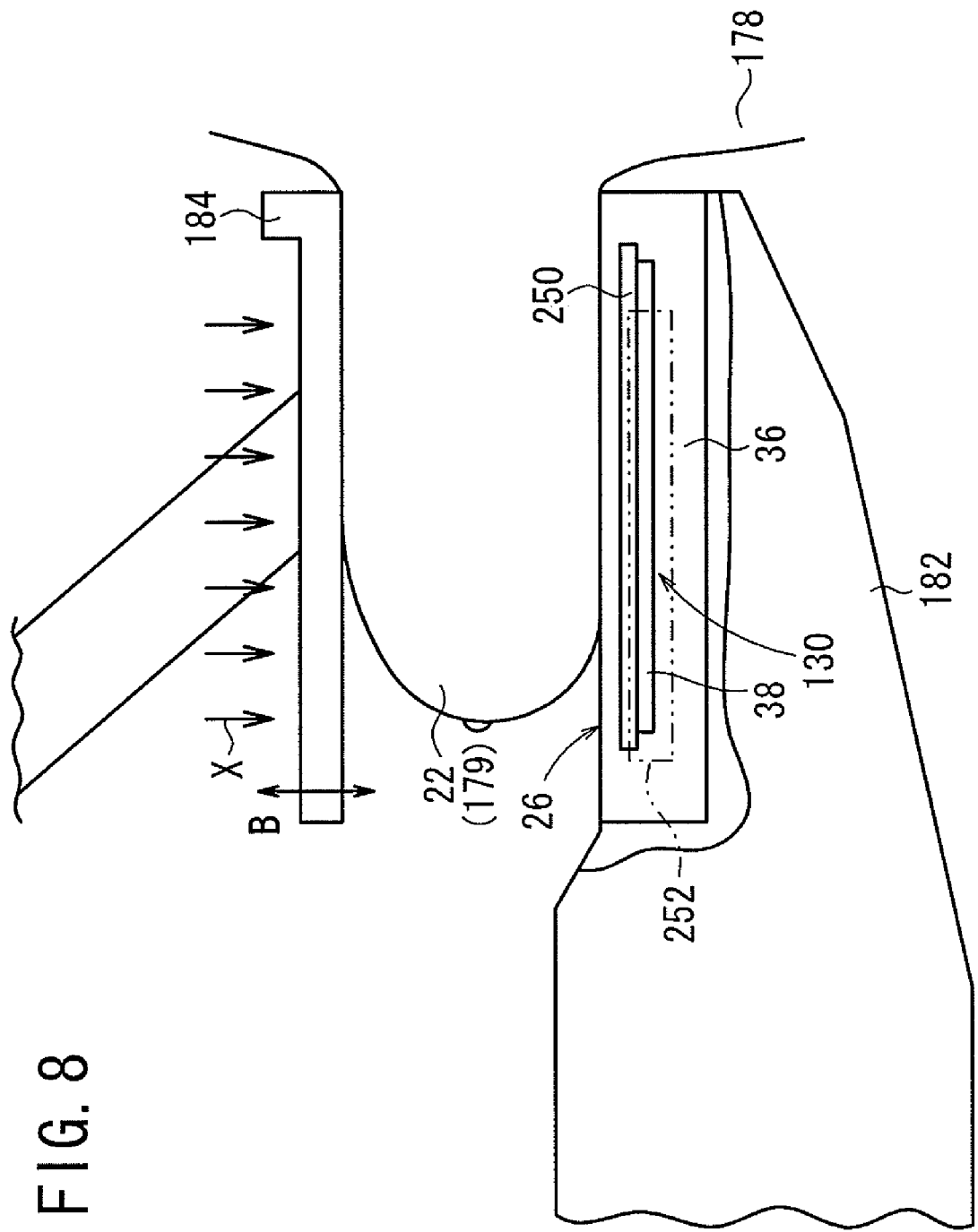
FIG. 8 is a fragmentary vertical elevational view, partly in cross section, showing internal structural details of an image capturing base of the mammographic apparatus shown in FIG. 7.

FIG. 8 shows internal structural details of the image capturing base 182 of the mammographic apparatus 170. In FIG. 8, the breast 179 of the subject 22 to be imaged is shown as being placed between the image capturing base 182 and the compression plate 184.

The image capturing base 182 houses therein the radiation solid-state detecting device 26 for storing radiation image information, which is captured based on the radiation X output from the radiation source in the radiation source housing unit 180, and for outputting an electric signal representative of the stored radiation image information. In FIG. 8, the cooling panel 130 is disposed on the irradiated surface of the sensor substrate 38. In order to prevent heat radiated from the heat radiating blocks 252 from affecting the subject 22, the heat radiating blocks 252 do not extend up to the subject 22.

In the mammographic apparatus 170 shown in FIGS. 7 and 8, the cooling panel 130 is disposed on the irradiated surface of the sensor substrate 38. However, the cooling panel 130 may also be disposed on the rear surface of the sensor substrate 38.

The radiation solid-state detecting device 26, which includes the cooling panel 130 disposed on the surface of the sensor substrate 38, is housed within the image capturing base 182. The mammographic apparatus 170 offers the same advantages as described above according to the present invention.

Figure 9:
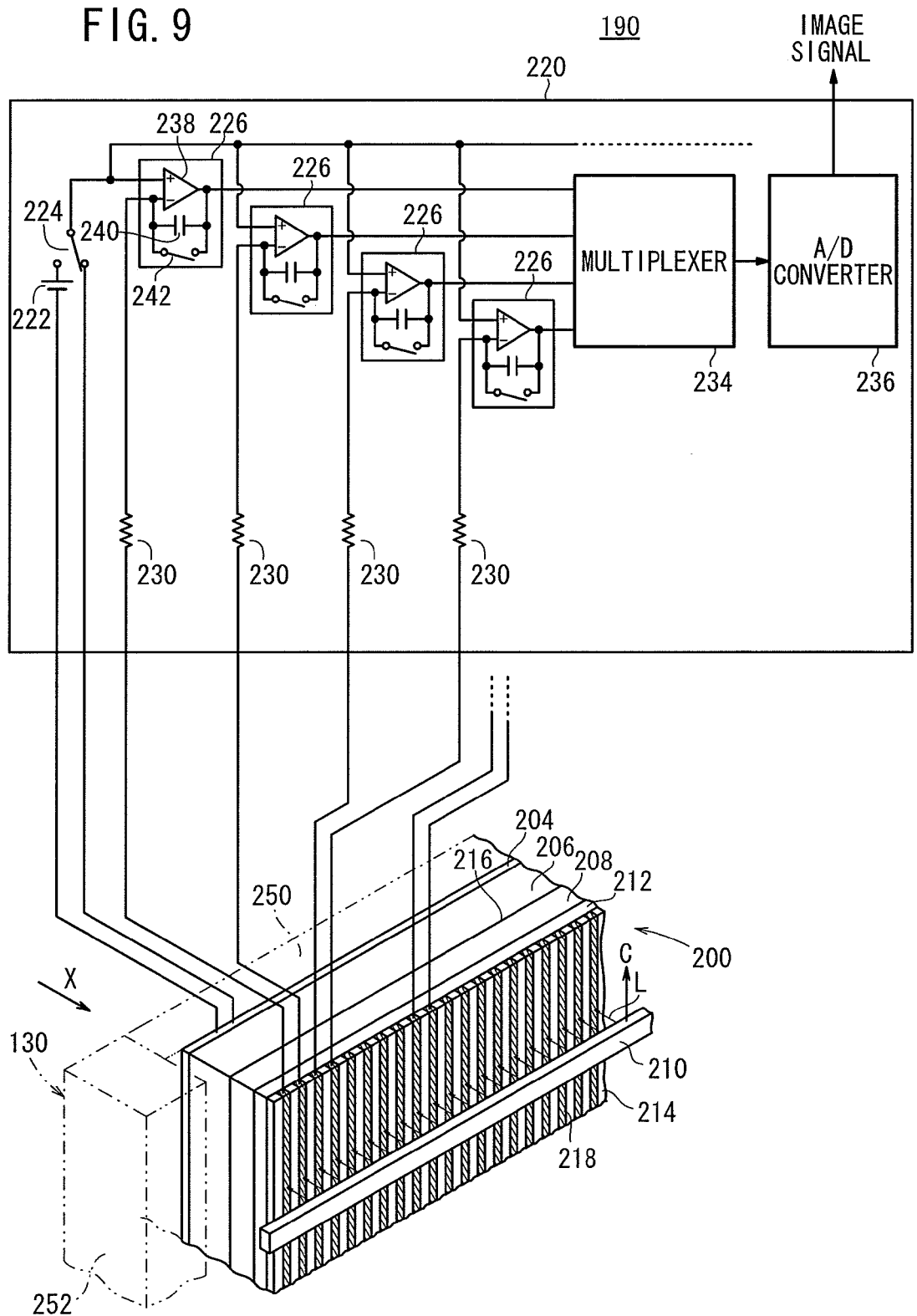
FIG. 9 is a view showing a radiation solid-state detecting device according to another embodiment of the present invention.

FIG. 9 shows a light readout type radiation solid-state detecting device 190 according to another embodiment of the present invention. Unlike the direct conversion type radiation solid-state detecting device 26 shown in FIG. 5, which employs the TFTs 52, the light readout type radiation solid-state detecting device 190 includes a sensor substrate 200 for storing radiation image information as an electrostatic latent image and enabling reading of the electrostatic latent image as electric charge information when the sensor substrate 200 is irradiated with reading light L from a reading light source 210.

The sensor substrate 200 comprises a first electrode layer 204 permeable to radiation X, a recording photoconductive layer 206, which becomes electrically conductive when irradiated with radiation X, a charge transport layer 208 that acts substantially as an electric insulator with respect to latent image electric charges and as an electric conductor with respect to transport electric charges, which are of an opposite polarity to the latent image electric charges, a reading photoconductive layer 212 which becomes electrically conductive when irradiated with the reading light L from the reading light source 210, and a second electrode layer 214 permeable to the reading light L. The layers are successively arranged in this order, from the surface of the sensor substrate 200 that is irradiated with the radiation X.

A charge storage region 216 for storing electric charges generated by the recording photoconductive layer 206 is disposed between the recording photoconductive layer 206 and the charge transport layer 208. The second electrode layer 214 comprises a number of linear electrodes 218 extending in the direction indicated by the arrow C, which is perpendicular to the direction in which the reading light source 210 extends. The first electrode layer 204 and the linear electrodes 218 of the second electrode layer 214 are connected to a signal reading circuit 220, for reading electric charge information from the latent image electric charges stored in the charge storage region 216.

The signal reading circuit 220 comprises a power supply 222 and a switch 224 for applying a given voltage between the first electrode layer 204 and the second electrode layer 214 of the sensor substrate 200, a plurality of current detecting amplifiers 226 connected to the linear electrodes 218 of the second electrode layer 214 for detecting currents that represent the radiation image information as latent image electric charges, a plurality of resistors 230 connected to the current detecting amplifiers 226, a multiplexer 234 for successively switching between output signals from the current detecting amplifiers 226, and an A/D converter 236 for converting analog image signals from the multiplexer 234 into digital image signals. Each of the current detecting amplifiers 226 comprises an operational amplifier 238, an integrating capacitor 240, and a switch 242.

In FIG. 9, the cooling panel 130 is disposed on the irradiated surface of the sensor substrate 200. However, the cooling panel 130 may also be disposed on the rear surface of the sensor substrate 200.

The radiation solid-state detecting device 190 shown in FIG. 9 operates as follows: The switch 224 is operated to connect the movable contact thereof to the power supply 222 so as to apply voltage between the first electrode layer 204 and the second electrode layer 214, whereupon radiation X is applied to the subject 22 (see FIG. 1). Radiation X that has passed through the subject 22 is applied through the first electrode layer 204 to the recording photoconductive layer 206. The recording photoconductive layer 206 becomes electrically conductive and generates electric charge pairs. Among the generated electric charge pairs, positive electric charges are combined with negative electric charges supplied from the power supply 222 to the first electrode layer 204, and the positive electric charges disappear. Negative electric charges generated by the recording photoconductive layer 206 move toward the charge transport layer 208. Since the charge transport layer 208 acts substantially as an electric insulator with respect to the negative electric charges, the negative electric charges are stored as an electrostatic latent image in the charge storage region 216, which exists as an interface between the recording photoconductive layer 206 and the charge transport layer 208.

After the electrostatic latent image has been stored in the sensor substrate 200, the signal reading circuit 220 reads the radiation image information. The switch 224 is operated to connect the movable contact thereof between the non-inverting input terminals of the operational amplifiers 238 of the current detecting amplifiers 226 and the first electrode layer 204 of the sensor substrate 200.

While the reading light source 210 moves in the auxiliary scanning direction, as indicated by the arrow C, the reading light source 210 applies reading light L to the reading photoconductive layer 212. The switches 242 of the current detecting amplifiers 226 are turned on and off at intervals corresponding to the pixel pitch in the auxiliary scanning direction, for thereby reading the radiation image information as electric charge information representing the electrostatic latent image.

When reading light L is applied through the second electrode layer 214 to the reading photoconductive layer 212, the reading photoconductive layer 212 becomes electrically conductive and generates electric charge pairs. Among the generated electric charge pairs, positive electric charges reach the charge storage region 216 through the charge transport layer 208, which acts substantially as an electric insulator with respect to the positive electric charges. In the charge storage region 216, the positive electric charges are combined with negative electric charges, which represent the electrostatic latent image stored in the charge storage region 216, and the positive electric charges disappear. The negative electric charges generated by the reading photoconductive layer 212 are recombined with the positive electric charges of the linear electrodes 218 of the second electrode layer 214, and the negative electric charges disappear. When the electric charges disappear, currents are generated by the linear electrodes 218 and are read by the signal reading circuit 220 as electric charge information that represents the radiation image information.

Currents generated by the linear electrodes 218 are integrated by the current detecting amplifiers 226, and supplied as voltage signals to the multiplexer 234. The multiplexer 234 successively switches between the current detecting amplifiers 226 in the main scanning direction, along which the linear electrodes 218 are arrayed, and supplies voltage signals to the A/D converter 236. The A/D converter 236 converts the supplied voltage signals, which are analog image signals, into a digital image signal, and supplies digital image signals representing the radiation image information to the image processor 32. Each time that radiation image information is read from an array of pixels across the auxiliary scanning direction, the switches 242 of the current detecting amplifiers 226 are turned on in order to discharge the electric charges stored in the integrating capacitors 240. While the reading light source 210 is moved in the auxiliary scanning direction, as indicated by the arrow C, the above operations are repeated in order to read the two-dimensional radiation image information stored in the sensor substrate 200.

In the image capturing system 20, which incorporates the radiation solid-state detecting device 190, the cooling panel 130 is disposed on the surface of the sensor substrate 38.

Therefore, the image capturing system 20 that incorporates the radiation solid-state detecting device 190 therein offers the same advantages as those described above according to the present invention.

Rather than the direct conversion type radiation solid-state detecting device 26 or the light readout type radiation solid-state detecting device 190 for converting applied radiation X directly into electric charge information, an indirect conversion type radiation detector including a scintillator for converting applied radiation X into visible light may be employed, together with a detecting device for converting the visible light into electric charge information.

Instead of the TFTs 52, such a device as a CCD (Charge Coupled Device), a CMOS (Complementary Metal Oxide Semiconductor) device or the like may be used for a direct or indirect conversion type radiation detecting device.

When radiation image information is recorded in each of the pixels 50, or when recorded radiation image information is read from each of the pixels 50, noise generated upon energizing the fan 140 may potentially be added to the radiation image information, which tends to lower the quality of the radiation image information. Such a problem may be solved as follows: When radiation image information is recorded in and/or read from the pixels 50, the temperature regulation control means 135 is inactivated in order to halt cooling of the sensor substrate 38. When radiation image information is not recorded in and/or read from the pixels 50, the temperature regulation control means 135 is reactivated in order to cool the sensor substrate 38.

Rather than cooling the heat radiating blocks 252 with the fan 140, the heat radiating blocks 252 may also be cooled by means of heat pipes, a thermally conductive gel, or by cooling water.

Although certain preferred embodiments of the present invention have been shown and described in detail, it should be understood that various changes and modifications may be made to the embodiments without departing from the scope of the invention as set forth in the appended claims.

What is claimed is:

1. An image detecting device comprising:
    an image detector for recording an image therein and outputting the recorded image as image information; and
    a cooling panel disposed on a surface of said image detector for cooling the image detector,
    wherein said cooling panel has a thermal conductivity oriented in a planar direction along the surface of said image detector,
    wherein said cooling panel comprises:
        a carbon sheet disposed so as to entirely cover the surface of said image detector and having end portions projecting beyond side edges of said image detector; and
        two heat radiating members respectively coupled to said end portions of said carbon sheet,
    wherein said carbon sheet comprises a plurality of carbon nanotubes extending from one of said end portions to the other of said end portions, said two heat radiating members being coupled to respective tip ends of said carbon nanotubes, and
    wherein said two heat radiating members radiate heat transferred from said image detector through said carbon sheet to outside.

2. An image detecting device according to claim 1, wherein the surface of said image detector on which said carbon sheet is disposed has an elongate rectangular shape as viewed in plan, and said carbon nanotubes extend in transverse directions of said surface of said image detector.

3. An image detecting device according to claim 1, further comprising:
    a temperature sensor for detecting the temperature of said image detector; and
    a cooling fan for applying air to said heat radiating member to cool the heat radiating member.

4. An image detecting device according to claim 3, further comprising:
    a temperature controller for determining whether a temperature of said image detector detected by said temperature sensor has exceeded a predetermined upper-limit temperature, and energizing said cooling fan to lower the temperature of said image detector to said predetermined upper-limit temperature if the temperature controller judges that the temperature of said image detector has exceeded said predetermined upper-limit temperature.

5. An image detecting device according to claim 1, wherein said image detecting device comprises a radiation image information detecting device;
    said image detector records radiation having passed through a subject and applied to a surface of the image detector as a radiation image, and outputs a recorded radiation image as radiation image information;
    said cooling panel is disposed on a surface of the image detector that is irradiated with radiation, or on a rear surface of said image detector, which is opposite to said surface; and
    said cooling panel is permeable to said radiation if said cooling panel is disposed on the surface of the image detector that is irradiated with radiation.

6. An image detecting device according to claim 5, wherein said radiation image information detecting device comprises a radiation solid-state detecting device for storing said radiation having passed through said subject as electric charge information, and reading stored electric charge information as said radiation image information.

7. An image detecting device according to claim 6, wherein said radiation solid-state detecting device comprises a light readout type detector for reading the stored electric charge information as said radiation image information in response to reading light applied thereto.

8. An image capturing system comprising:
    an image detecting device according to claim 1; and
    a controller for controlling said image detecting device.

9. An image capturing system according to claim 8, further comprising:
    a radiation generator for generating radiation and applying the radiation to a subject;
    wherein said image detecting device records the radiation having passed through the subject as a radiation image, and outputs the recorded radiation image as radiation image information; and
    said controller controls said radiation generator and said image detecting device.

* * * * *